United States Patent [19]

Rousset et al.

[11] Patent Number: 4,782,120

[45] Date of Patent: Nov. 1, 1988

[54] NON-POLLUTING THINNING ADJUVANT FOR SEA-WATER AND/OR FRESH WATER BASED DRILLING MUDS

[75] Inventors: Jacky Rousset, Baneins; Jean-Bernard Egraz, Ecully; Gilles Letetour, Aurions, all of France

[73] Assignee: Coatex, S.A., Caluire, France

[21] Appl. No.: 38,483

[22] Filed: Apr. 13, 1987

Related U.S. Application Data

[63] Continuation of Ser. No. 556,314, Nov. 30, 1983, abandoned.

[30] Foreign Application Priority Data

Nov. 30, 1982 [FR] France ................. 82 20241

[51] Int. Cl.$^4$ .................... C08F 130/02; C08F 230/02
[52] U.S. Cl. ........................ 525/326.6; 525/369; 525/379; 525/380; 525/381; 525/330.2; 525/382; 526/277
[58] Field of Search ............. 526/277, 210, 278; 525/340, 379, 380, 381, 382, 369, 378

[56] References Cited

U.S. PATENT DOCUMENTS 4,177,179 12/1979 Kurihara et al. ............. 526/277
4,487,859 12/1984 Martino ..................... 526/277
4,518,745 5/1985 Engelhardt .................. 526/278

FOREIGN PATENT DOCUMENTS 58-147412 9/1983 Japan ....................... 526/277

OTHER PUBLICATIONS

Chem. Abstracts vol. 86, entry 109852, Pons et al., Apr. 7, 1977.
Chem. Abstracts vol. 86, entry 190853, Pons et al., Apr. 7, 1977.

Primary Examiner—Joseph L. Schofer
Assistant Examiner—Peter F. Kulkosky
Attorney, Agent, or Firm—Oblon, Fisher, Spivak, McClelland & Maier

[57] ABSTRACT

Non-polluting thinning adjuvant for sea-water and/or fresh-water based drilling muds.

Non-polluting thinning adjuvant for sea-water and/or fresh-water based drilling muds, with the aim to maintain their rheological characteristics in the extreme conditions of temperature and pressure which prevail in wells drilled at great depths. This thinning adjuvant is characterized by the fact that it is a hydrosoluble copolymer resulting from the copolymerization of ethylenic acids, acrylamides and ethylenic esters of phosphoric acid.

Its general formula is:

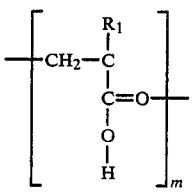

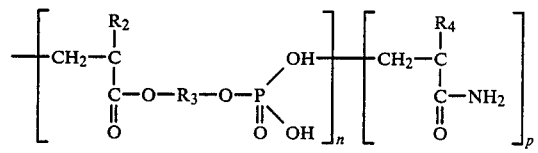

in which the indices m,n,p -expressed in % in mole- are chosen from the following intervals:

$0\% < m < 90\%$ $2\% < n < 100\%$ $0\% < p < 90\%$ and where radicals $R_1$, $R_2$ and $R_4$ are chosen from the group consisting of H and the alkyles, and radical $R_3$ is chosen from the group consisting of alkylenes and alkylene-oxides and/or polyalkylene oxides.

12 Claims, No Drawings

NON-POLLUTING THINNING ADJUVANT FOR SEA-WATER AND/OR FRESH WATER BASED DRILLING MUDS

This application is a continuation of application Ser. No. 556,314, filed on 11-30-83, now abandoned.

The present invention concerns a non-polluting adjuvant for drilling fluids, consisting in the copolymers resulting from the copolymerization of ethylenic acids, acrylamids and ethylenic esters of phosphoric acid. This adjuvant acts as a thinning agent for sea-water and/or fresh-water based muds used in extreme conditions of temperature and pressure.

The invention also concerns drilling muds in which the thinning adjuvant is used.

Rotary drilling systems have been known for a long time—in oil search—to be used to drill oil and/or gas production wells. These rotary drilling systems consist of a drilling bit fitted with appropriate "teeth", then a set of pipes assembled rigidly together end to end (called "drill pipe string"), the diameter of which is smaller than the one of the drilling bit. This whole solidary equipment—drill bit and drill pipe string—is driven into rotation from a platform situated above the well being drilled. As the drill bit attacks and goes through the geological strata, the crushed mineral materials must be cleared away from the bottom of the hole to enable the drilling operation to carry on. This is why the expert invented a long time ago a drilling fluid—a watery dispersion of appropriate materials of a mineral and/or organic origin—which, pumped down into the drill pipe string, ensures the cooling and lubrication of the drill bit, the conveying towards the surface of the cuttings up the annular space between the drill string and the borehole, the stability of the wall of the borehole, prevents the rushing-in of water, gas or oil, and finally helps the penetration of the drill bit.

The basic problem facing the expert when it comes to the elaboration of a drilling mud, is to gauge and master its behaviour during the drilling operation. As a matter of fact, as the drilling mud goes through very different geological formations, its rheological characteristics as well as other characteristics can be greatly affected, for example by the mineral materials forming the strata it goes through or even by the infiltration of sea-water and/or fresh-water. This is why the expert—for a long time—has been trying to master the composition of drilling muds by using chemicals of mineral or organic origin, so that the behaviour of these drilling muds is more regular and reproducible; and this in spite of conditions of temperature and pressure inherent with deeper and deeper drilling operations.

More, the expansion of oil search in seas has made this problem more difficult to solve because drilling muds are made with saline water (sea-water) and therefore their behaviour is more difficult to control.

For the expert, the ideal drilling mud—the characteristics of which he wishes to master—would be the one with the following aptitudes:

first, to have rheological characteristics as desirable as possible to be able to transport the mineral cuttings set in dispersion in situ, although some of these cuttings may contaminate the mud, then, to allow the separation of cuttings by all known means as soon as the mud flows out of the hole, then, to have such required density as to exert sufficient pressure on the drilled geological formations, finally, to retain its fundamental rheological qualities as it is submitted—in very deep drilling—to higher and higher temperatures.

To the watery drilling muds containing colloidal mineral materials such as "swelling" clays and in particular bentonites and attapulgites, thickening mineral materials such as for example barite, calcium carbonate, ilmenite, the expert has therefore added chemical adjuvants of mineral and/or organic origin in order to try and give these muds a minimum level of stability, whatever the geological site being drilled.

The chemical adjuvants used in the past are of various and numerous origins.

Phosphates and polyphosphates—which are meant to act as thinning agents of the drilling mud—cause a deflocculation of colloidal clay and enable the use of a mud of greater density and lower viscosity, ensuring at the same time of certain reduction in the filtrate.

However, and this is a major drawback, phosphates and polyphosphates are generally unstable, even at a low temperature such as 50° C. for example, and consequently a reduction in or even a disappearance of their role as a stabilizer occurs.

In the same way, lignine used in watery drilling fluids has the reputation to control the thixotropy of these fluids; but the introduction into the fluid during the drilling process of contaminating agents such as NaCl or $CaSO_4$ causes its gradual precipitation, thus rendering its action inefficient. Facing such a drawback the expert has used in drilling fluids the following chemicals: lignosulfonates in the form of salt of Calcium, Sodium, Iron, Chromium or simultaneously salt of Iron and Chromium, to act as a thinning agent, i.e. an agent for the stabilization of mud viscosity at the value desired by the user. But it is well known that Sodium and Calcium lignosulfonates do not serve very well the purpose of stabilizing mud viscosity, and that Chromium or Iron-and-Chromium lignosulfonates which have replaced them are important factors of the pollution of the environment, thus inciting the user to reduce their usage, though to this date they are the best available stabilizing agents, as they retain a resonable efficiency, even at temperatures of around 150° C. at the bottom of the hole.

Other chemical adjuvants have been suggested in the specialized litterature whose aim was to play a specific role in drilling fluids. Thus U.S. Pat. No. 3,730,900 recommends the use, as a suitable agent for colloidal stabilization, of a copolymer of maleic anhydride and sulfonic styrene acid. But, if this agent for colloidal stabilization seems to act in an interesting manner in drilling fluids, its synthesis—which requires different stages in a solvent environment—makes it suitable for an exploitation of industrial dimension with great difficulty only.

In the same way, and to the end of playing a specific role, derivatives of acrylic acid are known to be thickening agents in drilling fluids or other industrial application. For instance U.S. Pat. No. 4,059,552 describes the use—as a thickening agent—of a product of the acrylamide/sodium acrylate type, or the use of substituted acrylates.

Other derivatives of acrylic acid such as copolymers of acrylamide and derivatives of Sodium acrylate have been quoted in U.S. Pat. Nos. 3,558,545 and 3,472,325 as being agents of flocculation in drilling muds.

More, acrylic derivatives such as copolymers of sulfonic methylacrylamido-alkyl acid and a methyl-acrylamide are, as taught by French Pat. No. 2,450,864, capable of acting as a reducer of filtrate.

Finally, as U.S. Pat. No. 3,764,530 points out, salts of polyacrylic acids show little efficiency as thinning agents in environments with a high electrolytes content such as for example saline aqueous phases.

Thus earlier findings recommend to the expert solutions which are not totally satisfactory because the suggested chemical adjuvants are often disappointing: their effect is weakened either by the presence of embarassing mineral compounds such as NaCl, CaCO3 and CaSO4, or by the evolution of the temperature at the bottom of the hole, or even because these adjuvants become inefficienct or are totally inhibited when used in a drilling fluid whose aqueous phase is saline, or finally because one of these adjuvants can pollute the environment.

With the knowledge of the previously mentioned drawbacks, the Petitioner carried on with its research and has now found and perfected a non-polluting thinning adjuvant of great efficiency.

According to the invention the thinning adjuvant meant to be used in aqueous drilling muds—whether saline or not—with the aim to preserve their rheological characteristics in extreme conditions of temperature and pressure prevailing at the bottom of holes drilled to great depths is characterized by the fact that it is a hydrosoluble copolymer resulting from the copolymerization of ethylenic acids, acrylamides and ethylenic esters of phosphoric acid, of general formula:

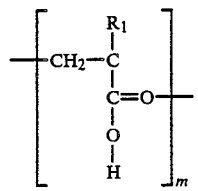

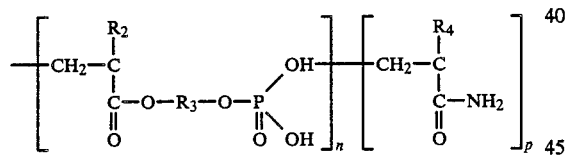

in which the indices m, n, p,—expressed in % in mole—are chosen from the intervals:

$0\% \leq m \leq 90\%$ $2\% \leq n \leq 100\%$ $0\% \leq p \leq 90\%$

According to the invention, radicals $R_1$, $R_2$ and $R_4$ can be chosen from the group made up by H and the alkyles, while radical $R_3$ is either an alkylene, or an oxide and/or a polyalkylene oxide or finally a combination of alkylene and alkylene oxide and/or polyalkylene oxide.

Preferably, radicals, $R_1$, $R_2$ and $R_4$ are chosen from the group made up by H and/or alkyles from $C_1$ to $C_{18}$, while radical $R_3$ is either an alkylene of structural unit $(-CH_2-)_q$ in which q can take the values of the interval 1 to 18 and preferably the values of the interval 2 to 4, or it is an oxide or a polyalkylene oxide of structural unit $(-R_5-O)_r$ in which $R_5$ is an alkylene radical of $C_1$ to $C_4$ where r can take the values of the interval 1 to 30 and preferably the values of the interval 1 to 10, or it is, finally, a combination of the two structural units, such as $(-R_5-O)_r-(CH_2)_q$.

The preparation of the copolymer according to the invention demands the presence of the monomers necessary for the forming of the structural units making up the previously quoted formula.

The first monomer—an ethylenic acid—is preferably chosen from the group of the following acids: acrylic and/or methacrylic, itaconic, crotonic, isocrotonic, aconitic, fumaric, mesaconic, sinapic, undecylenic, angelic, hydroxyacrylic, and maleic-anhydride.

The second monomer—an acrylamide—is preferably chosen from the group made up by acrylamide, methacrylamide, sulphonic-acrylamide-alkyl acid such as the sulphonic 2-acrylamide-2-methyl-propane.

The third monomer—an ethylenic ester of phosphoric acid—is for instance prepared by the reaction of phosphoric anhydride with an ethylenic alcohol according to the reaction:

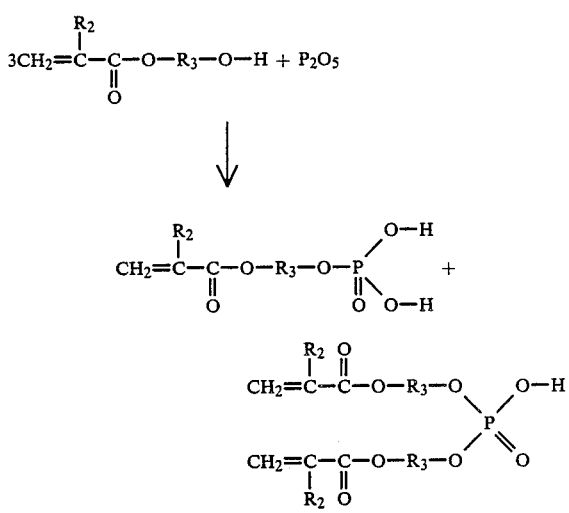

in which the ethylenic alcohol can be the monomethacrylate or the monoacrylate of ethyleneglycol, propyleneglycol, polyglycol, or their mix. This monomer is a polymerizable ethylenic ester of phosphoric acid.

The thinning adjuvant for drilling fluids results from the copolymerization of the previously quoted monomers—with the help of the initiators and regulators and according to the processes well known by the expert—in an aqueous, alcoholic, hydroalcoholic, aromatic or aliphatic environment, resulting in a copolymer whose molecular weight is generally situated between 500 and 50 000.

Thus, the polymerization environment can be: water, methanol, ethanol, propanol, isopropanol, butanols, dimethylformamide, dimethylsulfoxide, tetrahydrofurane, acetone, methylethylcetone, ethyl acetate, butyl acetate, hexane, heptane, benzene, toluene, xylene, mercaptoethanol, tertiododecylmercaptan, thioglycolic esters, n-dodecylmercaptan; the following acids: acetic, tartric, lactic, citric, gluconic, glucoheptonic, 2-mercaptopropionic; thiodiethanol, carbon tetrachloride chloroform, methylene chloride, methyl chloride, monopropyleneglycol esters and/or esters, ethyleneglycol esters and/or ethers.

Straight after the end of the polymerization, the solution of the obtained polymerizate can be partially or totally neutralized by an adequate neutralizing agent such as sodium-, potassium-, ammonium-, calcium-, hydroxide, or by a primary, secondary or tertiary aliphatic and/or cyclic amine such as for example ethanolamines (mono-, di-, tri-, ethanolamine), mono- and di-ethylamine, cyclohexylamine, methylcyclohexylamine . . .

The aqueous phase containing the copolymer as invented can be used in this aqueous form as a thinning agent for drilling muds, but it can also be processed—using all known methods—so as to eliminate this aqueous phase and to isolate the copolymer in the form of a fine powder which can be used under this other form as a thinning adjuvant.

The full significance and interest of this invention will be better understood by reading the following examples.

EXAMPLE 1

This example illustrates the preparation of the phosphoric monomer.

110 Kg of ethyleneglycol monomethacrylate have been put into an industrial reactor, then, while stirring all the time, 40 Kg of $P_2O_5$ have been added very slowly—the whole mixture being cooled so as to maintain the temperature below 30° C.

After $P_2O_5$ has been added, the temperature is allowed to reach approximately 40° C., while stirring is maintained. The result is a viscous liquid made up by a mixture of phosphoric monoester and diester of ethyleneglycol monomethacrylate.

This monomer is used in the preparation of the copolymers.

EXAMPLE 2

This example illustrates one way of preparing a copolymer of the phosphatic monomer (obtained in example 1) and acrylic acid.

To this end the following ingredients were first placed into a reactor:

| water | 250 Kg |
|---|---|
| isopropanol | 311 Kg |
| $FeSO_4, 7H_2O$ | 0.47 Kg |
| Hydroxylamine sulfate | 0.73 Kg |
| $H_2SO_4$ at 100% | 0.31 Kg |

These ingredients were heated to a temperature of 80° C.

Then, over a period of 3 hours approximately and while maintaining the temperature at the 80° C. level, a blend consisting of the following was added:

| $H_2O$ | 256.2 Kg |
|---|---|
| acrylic acid at 90% | 555.5 Kg |
| phosphate of ethyleneglycol methacrylate (prepared as per example 1) | 125.0 Kg |
| hydroxylamine sulfate | 8.0 Kg | together with a catalyst consisting of:

| $H_2O_2$ at 120 vol. | 35.1 Liter |
|---|---|
| $H_2O$ | 125.0 Liter |

After the catalyst and the previously described blend were added, the whole mixture was distilled at the temperature of 100° C. so as to completely eliminate the isopropylic alcohol.

After the mixture was cooled down to 20° C., it was neutralized with a 50% NaOH solution until a pH of approximately 8 was obtained.

Finally, the solution containing the copolymer was adjusted until a final concentration of 43% active ingredient was obtained.

The obtained copolymer contained the following—in % in weight—:

| acrylic acid | 80 |
|---|---|
| ethyleneglycol methacrylate phosphate | 20 |

Its molecular weight was between 4000 and 6000.

EXAMPLE 3

This example illustrates the preparation of a terpolymer of acrylic acid, acrylamide and phosphoric ethyleneglycol methacrylate, using the same process as described in example 2.

The final composition of the obtained terpolymer was as follows, expressed in % in weight:

| acrylic acid | 51 |
|---|---|
| acrylamide | 31.5 |
| ethyleneglycol-methacrylate phosphate (prepared as per example 1) | 17.5 |

The molecular weight of the said terpolymer was between 5000 and 7000.

EXAMPLE 4

This example illustrates the thinning action of the invented adjuvant used in a drilling mud whose aqueous phase was sea-water.

To this end, a drilling mud was prepared according to the following procedure:

1500 cm$^3$ of sea-water, taken from the Golfe du Lion in the Mediterranean sea, were placed in a 5-liter beaker.

while stirring (using a Rayneri turbine of 50 mm, rotating at 2000 rpm), 3 g of technical $Na_2CO_3$ were added in one time to cause a precipitation of ions $Ca^{2+}$ and $Mg^{2+}$.

75 g of bentonite A (yield of 20 to 25 m$^3$.t$^{-1}$ measured as per norm OCMA-DFCP4-1973) were added to this mixture while stirring was maintained for 15 minutes.

112.5 g of attapulgite B (yield 30 to 35 m$^3$.t$^{-1}$ measured as per norm OCMA-DFCP1—1973) were then added while stirring was maintained for 15 minutes.

37.5 g of carboxymethylcellulose (Technical C.M.C., low viscosity according to norm OCMA-DFCP2—1980) were then added while maintaining stirring for 15 minutes.

225 g of non-swelling calcic bentonite clay C (yield 15 m$^3$t$^{-1}$ approximately) were added while maintaining stirring for 20 minutes.

finally, the pH of the mixture was checked and corrected with a solution of sodium hydroxide so that its value would be between 9.5 and 10.

The thus prepared mud was then submitted to a shearing action using a L.R2 type Sylverson stirrer fitted with a high-shearing grate of 35 mm in diameter.

After a 24-hour rest period the mud was again stirred using the previously said Rayneri turbine for approximately 5 minutes.

Three samples of 500 cm³ each were then taken with the aim to test the efficiency of the invented thinning agent.

Trial 1 concerns the base mud exempt from any thinning agent.

Trial 2 concerns the same mud containing an adjuvant consisting of 7.5 g of an iron and chromium lignosulfonate—reputed to be the best thinning agent in the prior art.

Trial 3 concerns the same mud containing 7.5 g of active ingredient of the invented thinning adjuvant as obtained in example 3.

These three samples were submitted to a 10-minute stirring period using a Hamilton Beach (in Low position), well known from the specialist, while the pH was maintained in the 9.5-10 interval.

At the end of the stirring period the rheological characteristics at 20° C. were checked using a FANN 35 viscosimeter and the API filtrate was measured under a 100 psi pressure and during a 30-minute period according to the well known method.

The checked rheological characteristics were: apparent viscosity (AV), plastic viscosity (PV), Yield Value (YV), 0-Gel, 10-Gel, and the filtrate expressed in cm³—as they are defined in the "Manuel de Rheologie des fluides de forage et laitiers de ciment" (Handbook on the rheology of drilling fluids and cements slurry fluids) Technip 1979.

All obtained characteristics have been written down in the following Table I, as well as the computation of "n" and "k"—also defined in the previously quoted handbook.

TABLE I

| Temperature 20° C. | Trial 1 Reference | Trial 2 Prior Art | Trial 3 Invention |
|---|---|---|---|
| AV | 65 | 42.5 | 43.5 |
| PV | 25 | 35 | 29 |
| YV | 80 | 15 | 29 |
| 0-Gel | 75 | 8 | 20 |
| 10-Gel | 75 | 85 | 81 |
| API filtrate | 17 cm³ | 10 cm³ | 9 cm³ |
| "n" | 0.31 | 0.77 | 0.58 |
| "k" | 15.2 | 0.41 | 1.55 |

This Table shows that the mud containing the invented adjuvant has a rheological behaviour equivalent to the one of the mud containing the best adjuvant of the prior art, but it has a more favourable "k" coefficient.

More, the measure of the filtrate is equivalent between Trial 2 and Trial 3.

At the end of this series of measures the three muds were hot-rolled at 150° C. in an oven and kept at this temperature for 16 hours. They were then cooled down to 20° C. and were finally submitted to the same rheology and filtrate checks after they had been stirred for 5 minutes and after the pH had been adjusted to 9.5-10.

All obtained characteristics appear in the following Table II.

TABLE II

| After "aging" at 150° C. | Trial 1 Reference | Trial 2 Prior Art | Trial 3 Invention |
|---|---|---|---|
| AV | 92.5 | 48.5 | 29.5 |
| PV | 32 | 20 | 16 |
| YV | 121 | 57 | 27 |
| 0-Gel | 85 | 50 | 23 |
| 10-Gel | 85 | 52 | 55 |
| API filtrate | 62 cm³ | 39 cm³ | 34 cm³ |
| "n" | 0.28 | 0.33 | 0.46 |
| "k" | 26.7 | 9.83 | 2.44 |

Table II when compared with Table I shows that the rheological characteristics of the invented mud have been improved—or at least maintained—when the characteristics of the mud containing the best adjuvant of the prior art are already seriously badly affected.

At the end of these two series of measures the same muds were hot-rolled at 180° C. in an oven and maintained at this temperature for 16 hours. They were then cooled down to 20° C. and finally submitted to the same rheology and filtrate checks after they had been stirred for 5 minutes and after the pH had been adjusted to 9.5-10.

All obtained characteristics appear in the following Table III.

TABLE III

| After "aging" at 180° C. | Trial 1 Reference | Trial 2 Prior Art | Trial 3 Invention |
|---|---|---|---|
| AV | 146 | 92.5 | 27.5 |
| PV | 42 | 30 | 14 |
| YV | 208 | 125 | 27 |
| 0-Gel | 120 | 95 | 22 |
| 10-Gel | 125 | 99 | 44 |
| API filtrate | 70 cm³ | 41 cm³ | 37 cm³ |
| "n" | 0.22 | 0.25 | 0.42 |
| "k" | 63.4 | 32.6 | 2.99 |

This last Table, when compared with Tables I and II, shows that the invented mud retains all its rheological characteristics, when the characteristics of the mud containing the best adjuvant of the prior art have been totally destroyed.

It thus appears through this example that the invented thinning adjuvant preserves or improves the efficiency of the drilling mud when the mud is submitted to a rise—even an important one—in temperature.

EXAMPLE 5

This example illustrates the thinning action of the invented adjuvant used in a drilling mud whose aqueous phase is natural fresh water of hardness equal to 25° French TH.

The drilling mud, prepared according to the process described in example 4, had the following composition:

| water | 1500 cm³ |
|---|---|
| Bentonite (A) | 60 g |
| Calcic bentonite (C) | 150 g |

The pH was checked to be 9.5-10.

Three samples of 500 cm³ each were taken with the aim to test the efficiency of the invented thinning agent.

Trial 4 concerns the reference mud sample exempt from any thinning agent.

Trial 5 concerns the same mud containing an adjuvant consisting of 10 g of an iron and chromium lignosulfonate—reputed to be the best thinning adjuvant of the prior art.

Trial 6 concerns the same mud containing 10 g of active ingredient of the invented thinning agent, as obtained in example 3.

The three Trials were submitted to a 10-minute stirring period using a Hamilton-Beach in the Low position.

At the end of this 10-minute stirring period the rheological characteristics at 20° C. were checked and the filtrate measured, as previously described in example 4.

All results appear in the following Table IV.

TABLE IV

| Temperature 20° C. | Trial 4 Reference | Trial 5 Prior Art | Trial 6 Invention |
|---|---|---|---|
| AV | 56.5 | 47.5 | 18 |
| PV | 2 | 15 | 14 |
| YV | 109 | 65 | 8 |
| 0-Gel | 108 | 53 | 4 |
| 10-Gel | 142 | 72 | 5 |
| API filtrate | 10 cm$^3$ | 7 cm$^3$ | 5 cm$^3$ |
| "n" | 0.03 | 0.25 | 0.71 |
| "k" | 92 | 16.8 | 0.26 |

This Table shows that—with both Trials containing the same low quantity of thinning agent—the drilling mud containing the invented adjuvant demonstrates a rheological behaviour far more superior than the behaviour of the mud containing the iron and chromium lignosulfonate.

EXAMPLE 6

This example illustrates the thinning action of the invented adjuvant used in a drilling mud whose aqueous phase is a NaCl-saturated water.

The drilling mud—prepared according to the process described in example 4—had the following composition:

| NaCl saturated water | 1500 cm$^3$ |
|---|---|
| Attapulgite (B) | 112.5 g |
| Calcic bentonite (C) | 150 g |

The pH of this mud was checked to be 10.

Three samples of 500 cm$^3$ each were taken with the aim to test the efficiency of the invented thinning agent.

Trial 7 concerns the reference mud sample exempt from any thinning agent.

Trial 8 concerns the same mud containing 7.5 g of iron and chromium lignosulfonate—reputed to be the best thinning agent of the prior art.

Trial 9 concerns the same mud containing 7.5 g of active ingredient of the invented thinning adjuvant—as obtained in example 3.

These three Trials were submitted to a 10-minute stirring period using the Hamilton-Beach. At the end of the stirring period the rheological characteristics at 20° C. were checked and the filtrate measured—as previously described in example 4.

All results appear in the following Table V.

TABLE V

| Temperature 20° C. | Trial 7 Reference | Trial 8 Prior Art | Trial 9 Invention |
|---|---|---|---|
| AV | 36.5 | 35 | 15 |
| PV | 13 | 16 | 11 |
| YV | 47 | 38 | 8 |
| 0-Gel | 36 | 36 | 7 |
| 10-Gel | 39 | 34 | 29 |
| "n" | 0.28 | 0.37 | 0.66 |
| "k" | 10.5 | 5.37 | 0.31 |

This Table V shows the total inefficiency of the iron and chromium lignosulfonate whereas—in these conditions of application—the invented thinning adjuvant provides very interesting rheological characteristics.

EXAMPLE 7

This example shows the shale inhibiting action, when used with sea-water, of the invented adjuvant prepared as per example 3 and used in a drilling mud.

The drilling mud was prepared according to the process described in example 4 and had the following composition:

| sea-water (Golfe du Lion) | 1500 cm$^3$ |
|---|---|
| Na$_2$CO$_3$ | 3 g |
| Bentonite (A) | 75 g |
| Attapulgite (B) | 112.5 g |
| Carboxymethylcellulose | 37.5 g |

The pH of this mud was checked to be 9.5–10.

Three samples of 500 cm$^3$ each were taken with the aim to test the efficiency of the shale inhibiting action of the invented adjuvant.

Trial 10 concerns the reference mud sample exempt from any thinning agent.

Trial 11 concerns the same mud containing 7.5 g of iron and chromium lignosulfonate—reputed to be the best adjuvant of the prior art.

Trial 12 concerns the same mud containing 7.5 g of active ingredient of the invented adjuvant—as obtained in example 3.

These three Trials were submitted to a 10-minute stirring period using the Hamilton-Beach.

At the end of the stirring period the rheological characteristics at 20° C. were checked and the filtrate measured—as previously described in example 4.

All results appear in the following Table VI.

TABLE VI

| Temperature 20° C. | Trial 10 Reference | Trial 11 Prior Art | Trial 12 Invention |
|---|---|---|---|
| AV | 14 | 13 | 13 |
| PV | 12 | 11 | 11 |
| YV | 4 | 4 | 4 |
| 0-Gel | 2 | 2 | 2 |
| 10-Gel | 5 | 2 | 2 |
| API filtrate | 13 cm$^3$ | 8.5 cm$^3$ | 9.5 cm$^3$ |
| "n" | 0.81 | 0.79 | 0.79 |
| "k" | 0.10 | 0.11 | 0.11 |

This Table shows that the invented adjuvant—as well as the best adjuvant of the prior art—does not alter the rheological characteristics of the base mud (reference sample).

At the end of this first series of measures, each one of the muds (Trial 10, 11 and 12)—under the same stirring action—received a mineral load of 75 g of calcic bentonite (C), i.e. a total load of 150 g per liter, thus defining Trials 13, 14 and 15.

After a 20-minute stirring period using the Hamilton-Beach, the rheological characteristics at 20° C. were checked and the filtrate measured—as previously described in example 4.

All results appear in the following Table VII.

TABLE VII

| Temperature 20° C. | Trial 13 Reference | Trial 14 Prior Art | Trial 15 Invention |
|---|---|---|---|
| AV | 58 | 41 | 36 |
| PV | 30 | 31 | 29 |
| YV | 56 | 20 | 14 |
| 0-Gel | 54 | 25 | 6 |
| 10-Gel | 72 | 44 | 29 |
| API filtrate | 18.5 cm³ | 10 cm³ | 7.5 cm³ |
| "n" | 0.43 | 0.68 | 0.75 |
| "k" | 5.9 | 0.74 | 0.40 |

This Table—when compared with Table VI—shows that the invented adjuvant moderates the evolution of the rheological characteristics of the "loaded" mud, whereas this "moderating" action is less important in the case of the best adjuvant of the prior art.

At the end of this series of measures, the three muds (Trials 13, 14 and 15) were heat-rolled to 150° C. in an oven and maintained at this temperature for 16 hours. They were then cooled down to 20° C. and finally, after they had been stirred for 5 minutes and their pH adjusted to 9.5–10, they were submitted to the same rheology and filtrate checks.

All obtained characteristics appear in the following Table VIII.

TABLE VIII

| After "aging" at 150° C. | Trial 13 Reference | Trial 14 Prior Art | Trial 15 Invention |
|---|---|---|---|
| AV | 61 | 25.5 | 21 |
| PV | 20 | 18 | 15 |
| YV | 82 | 15 | 12 |
| 0-Gel | 39 | 18 | 11 |
| 10-Gel | 48 | 36 | 42 |
| API filtrate | 60 cm³ | 45 cm³ | 27 cm³ |
| "n" | 0.26 | 0.63 | 0.64 |
| "n" | 20.2 | 0.65 | 0.50 |

This Table—when compared with Table VII—does confirm the good efficiency of the invented adjuvant with regard to temperature rises, thus allowing a preconceived favourable opinion as to its behaviour in wells, and this even more since the said adjuvant allows a better control of the filtrate at high temperatures than the best adjuvant of the prior art.

EXAMPLE 8

This example illustrates the dispersing—and therefore thinning action of the invented adjuvant when $CaCO_3$ is put in suspension in sea-water (taken from the Golfe du Lion).

To this end:
- 465 g of sea-water are poured into a 2-liter beaker
- 20 g of the dry dispersing agent are added
- the pH of the solution is then adjusted to 9 using a NaOH solution
- 1000 g of precipitated $CaCO_3$ (SOCAL P3 of SOLVAY) are then slowly added under stirring action (using a 65 mm Rayneri turbine rotating at 1500 rpm)

At the end of this addition, stirring is maintained for 30 minutes. Viscosities at 10 rpm and 100 rpm are then measured at a temperature of 20° C. using a Brookfield RVS viscosimeter fitted with spindle no. 2.

Trial 16 is a reference sample free from any adjuvant.
Trial 17 concerns the dispersion mixture containing a sodium polyacrylate as an adjuvant, of molecular weight 5000, normally used in the prior art for this type of application in fresh water.

Trial 18 concerns the dispersion mixture containing the invented adjuvant, as per example 2.

The results appear in the following Table IX.

TABLE IX

| | Viscosity Cps | |
|---|---|---|
| | at 10 rpm | at 100 rpm |
| Trial 16 Reference | >10 000 | >10 000 |
| Trial 17 Prior Art | 3 200 | 610 |
| Trial 18 Invention | 960 | 330 |

This last Table does reveal the particularly efficient thinning action of the invented adjuvant.

We claim:

1. A non-polluting adjuvant for saline- or fresh-water based drilling muds to maintain the rheological characteristics under extreme conditions of temperature and pressure comprising a hydrosoluble copolymer obtained from copolymerization of ethylenic acids, acrylamides and ethylenic esters of phosphoric acid having the formula:

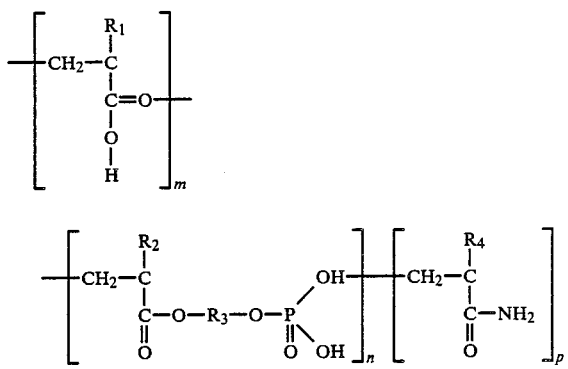

wherein the indices m, n and p expressed in mole % each define effective amount and are within the following ranges:

$0\% < m < 90\%$ $2\% < n < 100\%$ $0\% < p < 90\%$ and $R_1$, $R_2$ and $R_4$ are each selected from the group consisting of hydrogen and alkyl and $R_3$ is selected from the group consisting of alkylene, alkylene oxide and polyalkylene oxides.

2. An adjuvant as defined in claim 1 wherein $R_1$, $R_2$ and $R_4$ are selected from the group consisting of hydrogen and $C_1$–$C_{18}$ alkyl.

3. An adjuvant as defined in claim 1 wherein $R_3$ is selected from the group consisting of alkylene having the structure $(CH_2)_q$ where q is an integer from 1 to 18; polyalkylene oxides having the structure $(R_5-O)_r$ where $R_5$ is $C_1$ to $C_{14}$ alkylene and r is an integer from 1 to 30; and combinations thereof.

4. An adjuvant as defined in claim 1 wherein the ethylenic acid used in the copolymerization is selected from the group consisting of acrylic acid, methacrylic acid, itaconic acid, crotonic acid, isocrotonic acid, aconitic acid, fumaric acid, mesaconic acid, sinapic acid, undecylenic acid, angelic acid, hydroxylic acid and maleic anhydride.

5. An adjuvant as defined in claim 1 wherein the acrylamide used in the copolymerization is selected from the group consisting of acrylamide, methacrylamide, and sulfonicacrylamide-alkyl acids.

6. An adjuvant as defined in claim 1 wherein the ethylenic ester of phosphoric acid is produced by the reaction of $P_2O_5$ with ethylenic alcohol.

7. An adjuvant as defined in claim 6 wherein the ethylenic alcohol is selected from the group consisting of methacrylate and acrylate esters of ethylene glycol, propylene glycol, polyglycol and mixtures thereof.

8. An adjuvant as defined in claim 1 wherein the copolymerization is carried out in the presence of initiators and regulators in an aqueous, alcoholic, hydroalcoholic, aromatic or aliphatic medium.

9. An adjuvant as defined in claim 1 wherein the copolymer is partially or totally neutralized.

10. An adjuvant as defined in claim 9 wherein the neutralizing agent is selected from the group consisting of hydroxides of sodium, potassium, ammonium, or calcium and primary, secondary or tertiary aliphatic and/or cyclic amines.

11. An adjuvant as defined in claim 10 wherein said amines are selected from the group consisting of mono, di and triethanol amines, mono and diethyl amines, cyclohexylamine and methylcyclohexylamine.

12. An adjuvant as defined in claim 1 wherein the copolymer has a molecular weight ranging from between 500 and 50,000.

* * * * *